J. R. RICHARDSON.
Improvement in Locomotive Wheels.
No. 4,721. Reissued Jan. 23, 1872.
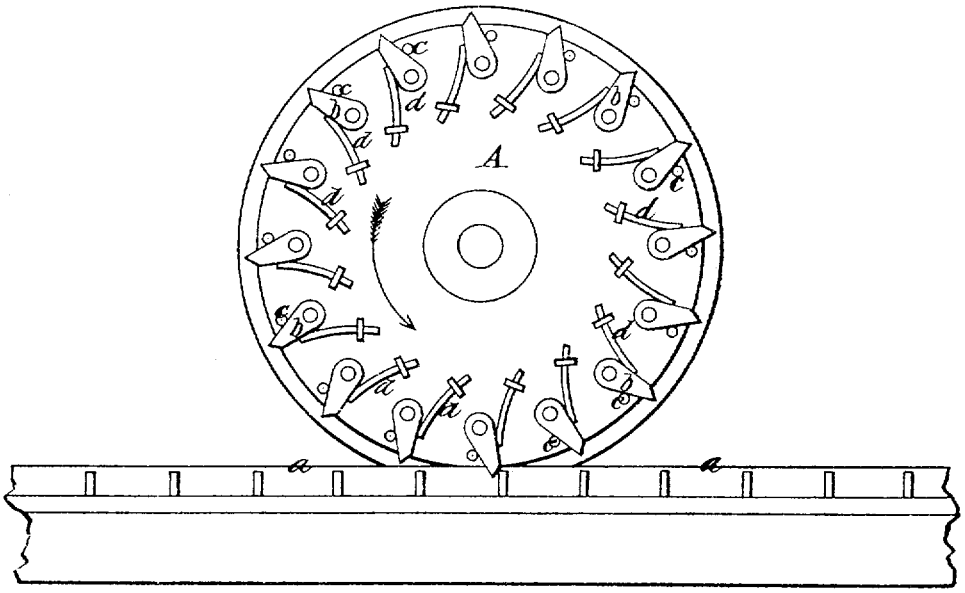
Witnesses.
E. H. Bates
Villette Anderson
Inventor.
Jno. R. Richardson
Chipman and Coomer & Co
Attys.
A.M. PHOTO-LITHOGRAPHIC CO. N.Y. (OSBORNE'S PROCESS.)

UNITED STATES PATENT OFFICE.

JOHN R. RICHARDSON, OF MAX MEADOWS, VIRGINIA.

IMPROVEMENT IN LOCOMOTIVE-WHEELS.

Specification forming part of Letters Patent No. 105,598, dated July 19, 1870; reissue No. 4,721, dated January 23, 1872.

Be it known that I, JOHN R. RICHARDSON, of Max Meadows, in the county of Wythe and State of Virginia, have invented a new, useful, and valuable Improvement in Devices to Prevent the Wheels of Locomotives from Slipping on the Track; and I do hereby declare that the following is a full, clear, and exact description of the construction and operation of the same, reference being had to the annexed drawing making a part of this specification and to the letters and figures of reference marked thereon.

The figure of the drawing is a representation of a side elevation of my improved device.

This invention consists in the combination, with the driving-wheel of a locomotive, of a series of pivoted spurs projecting beyond the periphery of the wheel and engaging with a row of teeth outside the main rail, thus rendering it impossible for the wheel to slip on a grade, the said spurs being combined with spring-arms, which press against them with force sufficient to keep the spurs up to the pins against which they bear and yet allow the spurs to yield if they should come in contact with a stone or other obstruction.

In the accompanying drawing, the letter A designates the wheel. *a* represents the track-rail on which it runs; *b*, the projecting spurs, arranged in an annular series near the periphery and on the outside of the wheel. The spurs are pivoted to the wheel; *c*, the pins against which the spurs bear; *d*, the springs which keep the spurs up to the pins. By means of these springs a provision is made for the yielding of the spurs in the event of their points coming in contact with a stone or other accidental obstruction. In the drawing an auxiliary toothed rail has been shown, it being my design to lay such an auxiliary rail outside of the main track-rails which may be now in use on grades. The teeth of this auxiliary rail are lettered *e*. Instead of such auxiliary rail I may use teeth furnished with shanks, said shanks being passed horizontally through the neck of the rail and the teeth standing vertically outside of the rail.

Having thus described my invention, what I claim, and desire to secure by Letters Patent, is—

The combination, with a locomotive or car wheel, of the spurs *b*, springs *d*, and pins *c*, substantially as specified.

In testimony that I claim the above I have hereunto subscribed my name in the presence of two witnesses.

JOHN R. RICHARDSON.

Witnesses:

F. S. SPILLER,

D. P. GRAHAM.